(12) United States Patent
Reynolds et al.

(10) Patent No.: US 11,636,506 B2
(45) Date of Patent: Apr. 25, 2023

(54) METHOD, APPARATUS, AND COMPUTER PROGRAM PRODUCT FOR OFFERING AND PROCESSING PROMOTIONS

(71) Applicant: GROUPON, INC., Chicago, IL (US)

(72) Inventors: Dylan C. Reynolds, Chicago, IL (US); Alan Deitch, Mount Prospect, IL (US)

(73) Assignee: GROUPON, INC., Chicago, IL (US)

( * ) Notice: Subject to any disclaimer, the term of this patent is extended or adjusted under 35 U.S.C. 154(b) by 0 days.

(21) Appl. No.: 17/808,779

(22) Filed: Jun. 24, 2022

(65) Prior Publication Data

US 2022/0391941 A1 Dec. 8, 2022

Related U.S. Application Data

(63) Continuation of application No. 17/301,024, filed on Mar. 22, 2021, now Pat. No. 11,403,660, which is a continuation of application No. 16/857,940, filed on Apr. 24, 2020, now Pat. No. 10,984,435, which is a continuation of application No. 15/199,035, filed on Jun. 30, 2016, now Pat. No. 10,672,020.

(60) Provisional application No. 62/186,541, filed on Jun. 30, 2015.

(51) Int. Cl.
 *G06Q 30/00* (2012.01)
 *G06Q 30/0226* (2023.01)
 *G06Q 30/0207* (2023.01)

(52) U.S. Cl.
 CPC ..... *G06Q 30/0229* (2013.01); *G06Q 30/0233* (2013.01); *G06Q 30/0236* (2013.01)

(58) Field of Classification Search
 None
 See application file for complete search history.

(56) References Cited

U.S. PATENT DOCUMENTS

| | | |
|---|---|---|
| 2010/0332308 A1 | 12/2010 | Yap et al. |
| 2015/0170192 A1 | 6/2015 | Santaella et al. |
| 2015/0254675 A1 | 9/2015 | Kannan et al. |
| 2018/0300805 A1 | 10/2018 | Elliott et al. |

OTHER PUBLICATIONS

U.S. Appl. No. 17/301,024, filed Mar. 22, 2021, U.S. Pat. No. 11,403,660, Issued.
U.S. Appl. No. 16/857,940, filed Apr. 24, 2020, U.S. Pat. No. 10,984,435, Issued.
U.S. Appl. No. 15/199,035, filed Jun. 30, 2015, U.S. Pat. No. 10,672,020, Issued.

*Primary Examiner* — Alvin L Brown
(74) *Attorney, Agent, or Firm* — Alston & Bird LLP

(57) ABSTRACT

Embodiments of the present invention provide methods, systems, apparatuses, and computer program products for classifying merchants. In one embodiment a method is provided comprising providing, a first promotion specifying a redemption and a charge monetary values, the redemption monetary value being specified by redemption parameters of the first promotion and a value indicative of a total amount of funds purchased in response to accepting an instance of the first promotion, wherein the funds purchased can be redeemed for offerings of one or more merchants specified by the promotion, the charge monetary value being a monetary value charged for accepting the first promotion, and providing a first classification classifying the first promotion as a promotion having a redemption monetary value that may be used to purchase offerings of the one or more merchants over the course of multiple transactions.

20 Claims, 14 Drawing Sheets

METHOD, APPARATUS, AND COMPUTER PROGRAM PRODUCT FOR OFFERING AND PROCESSING PROMOTIONS

CROSS REFERENCE TO RELATED APPLICATIONS

This application is a continuation of U.S. application Ser. No. 17/301,024, titled "METHOD, APPARATUS, AND COMPUTER PROGRAM PRODUCT FOR OFFERING AND PROCESSING PROMOTIONS," filed Mar. 22, 2021, which is a continuation of U.S. application Ser. No. 16/857,940, titled "METHOD, APPARATUS, AND COMPUTER PROGRAM PRODUCT FOR OFFERING AND PROCESSING PROMOTIONS," filed Apr. 24, 2020, now U.S. Pat. No. 10,984,435, which is a continuation of U.S. application Ser. No. 15/199,035, titled "METHOD, APPARATUS, AND COMPUTER PROGRAM PRODUCT FOR OFFERING AND PROCESSING PROMOTIONS," filed Jun. 30, 2016, now U.S. Pat. No. 10,672,020, which claims priority to and the benefit of U.S. Provisional Application No. 62/186,541, titled "METHOD, APPARATUS, AND COMPUTER PROGRAM PRODUCT FOR OFFERING AND PROCESSING PROMOTIONS," filed Jun. 30, 2015, the contents of each of which are incorporated by reference herein in their entirety.

BACKGROUND

The internet has transformed ways in which people communicate. A promotional and marketing service may utilize the internet to provide consumers with available promotions related to products, services or experiences offered by providers that may be of interest. Applicant has identified a number of deficiencies and problems associated with conventional systems and methods for providing and processing promotions. Through applied effort, ingenuity, and innovation, many of these identified problems have been solved by developing solutions that are included in embodiments of the present invention, many examples of which are described in detail herein.

BRIEF SUMMARY

This specification relates to offering and processing promotions.

In general, one innovative aspect of the subject matter described in this specification can be embodied in methods that include the actions of providing, by a first entity, a first promotion, to a first user device, the first promotion specifying a redemption and a charge monetary values, the redemption monetary value being specified by redemption parameters of the first promotion and a value indicative of a total amount of funds purchased in response to accepting an instance of the first promotion, wherein the funds purchased can be redeemed for offerings of one or more merchants specified by the promotion, the charge monetary value being a monetary value charged for accepting the first promotion, providing a first classification classifying the first promotion as a promotion having a redemption monetary value that may be used to purchase offerings of the one or more merchants over the course of multiple transactions, receiving data indicative of a first request to purchase one or more offerings of the one or more merchants, the one or more offering having a purchase price value that is only a portion of the redemption value, processing the first request, wherein the processing comprises: charging, against the redemption value, the portion of the redemption value, providing, to the first user device, a message specifying a remainder of the redemption value that remains available for purchasing offerings of the one or more merchants storing a third value, the third value being a portion of the portion of the redemption value and an amount of revenue allocated to the one or more merchants in response to processing the first request, receiving data indicative of a second request to purchase one or more different offerings of the one or more merchants, and processing the second request, wherein the processing comprises charging against the remainder of the redemption value a purchase price value for the one or more different offerings of the one or more merchants.

Other embodiments of this aspect include corresponding systems, apparatus, and computer programs, configured to perform the actions of the methods, encoded on computer storage devices.

These and other embodiments can each optionally include one or more of the following features providing, by the first entity, a second promotion, to the first user device, the second promotion specifying a redemption and a charge monetary values for the second promotion, the redemption monetary value for the second promotion being specified by redemption parameters of the second promotion and a value indicative of a total amount of funds purchased in response to accepting an instance of the second promotion, wherein the funds purchased can be redeemed for offerings of second one or more merchants specified by the promotion, the charge monetary value for the second promotion being a monetary value charged for accepting the second promotion, providing a second classification classifying the second promotion as a promotion having a redemption monetary value that may not be used to purchase offerings of the second one or more merchants over the course of multiple transactions, receiving data indicative of a third request to purchase one or more offerings of the second one or more merchants, the one or more offering having a purchase price value that is only a portion of the redemption value for the second promotion, and processing the third request, wherein the processing comprises charging against the redemption value for the second promotion the entire redemption value for the second promotion. Storing a fourth value, the fourth value being a portion of the redemption value for the second promotion and an amount of revenue allocated to the second one or more merchants in response to processing the third request. Determining a difference between the remainder of the redemption value and the purchase price value for the one or more different offerings and providing to the first user device a value indicative of the determined difference. Receiving, from the first user device, a request to pay the difference between the remainder of the redemption value and the purchase price value for the one or more different offerings, accessing payment information of a user of the first device, receiving authorization, from a second user device, approving the request to pay the difference between the remainder of the redemption value and the purchase price value for the one or more different offerings, processing a payment amount that is, at least, equal to the determined difference, and providing a message to the first user device indicating the payment amount processed.

In general, another aspect of the subject matter described in this specification can be embodied in methods that include the actions receiving, from the first user device, a first request to pay a first portion of the difference between the remainder of the redemption value and the purchase price value for the one or more different offerings, accessing payment information of a user of the first device, receiving, from a second user device, a second request to pay a second portion of the difference between the remainder of the redemption value and the purchase price value for the one or more different offerings, accessing payment information of a user of the second device, receiving authorization, from a third user device, approving the first and second requests to pay the first and second portions of the difference between the remainder of the redemption value and the purchase price value for the one or more different offerings, processing a payment amount that is, at least, equal to the first portion of the difference, processing a payment amount that is, at least, equal to the second portion of the difference, and providing a message to the first and the second user devices indicating that the payment amount processed.

Other embodiments of this aspect include corresponding systems, apparatus, and computer programs, configured to perform the actions of the methods, encoded on computer storage devices.

In general, one innovative aspect of the subject matter described in this specification can be embodied in methods that include the actions of providing a first classification classifying a first promotion as a promotion having a redemption monetary value for the first promotion that may be used to purchase offerings of one or more merchants over the course of multiple transactions, and classifying the first promotion as a promotion that may be used in combination with other promotions, providing a second classification classifying a second promotion as a promotion having a redemption monetary value for the second promotion that may be used to purchase offerings of one or more merchants over the course of multiple transactions, and classifying the second promotion as a promotion that may be used in combination with other promotions, determining, a first remainder of the redemption value for the first promotion that remains available for purchasing offerings of the one or more merchants, in response to processing one or more transactions for purchasing offerings using the first promotion, determining, a second remainder of the redemption value for the first promotion that remains available for purchasing offerings of the one or more merchants, in response to processing one or more transactions for purchasing offerings using the second promotion, receiving, a request to combine the first and second remainders, in response to the request, generating a third promotion having a third monetary value that is the combination of the first remainder and the second remainder, the third monetary value being a value that may be used to purchase offerings of one or more merchants, providing, to a first user device, a message indicating the redemption value of the third promotion.

Other embodiments of this aspect include corresponding systems, apparatus, and computer programs, configured to perform the actions of the methods, encoded on computer storage devices.

These and other embodiments can each optionally include one or more of the following features. In response to generating the third promotion, voiding the first and second promotions. Receiving a request for a refund for the third promotion and in response to receiving the request: processing a refund based on the third monetary value, voiding the third promotion, providing a message to the first user device indicating successful processing of the refund based on the third monetary value and specifying the third monetary value and a refund amount.

Particular embodiments of the subject matter described in this specification can be implemented so as to realize one or more of the following advantages. Eliminating or reducing the promotion and payment processing required by merchant machines. Provide means for consumers to redeem promotions and process payments through the promotional service, in turn, reduces the processing power requirement of the merchant devices. As processing operations would be otherwise performed by merchant devices, the stress on the merchant devices is reduced. In turn, this reduces reliance on third party services and software, and reduces the number of overall products that merchants rely on to maintain consumer relationships with respect to promotions.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
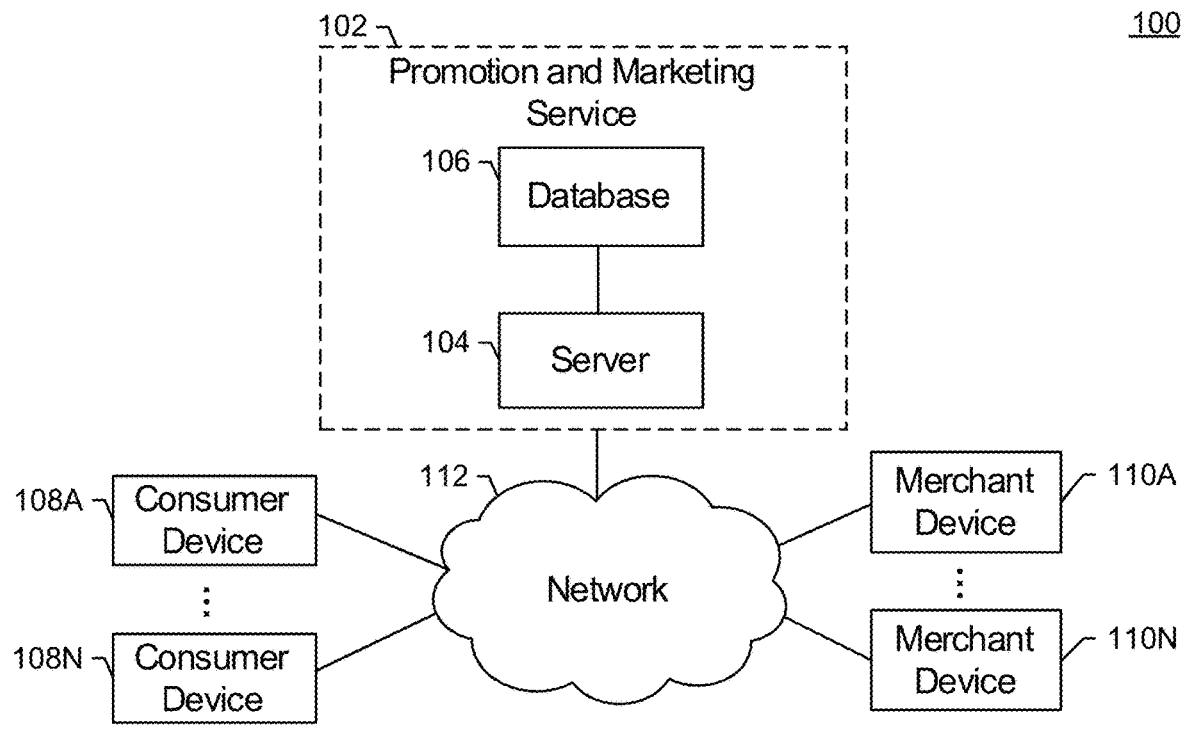
Figure 2:
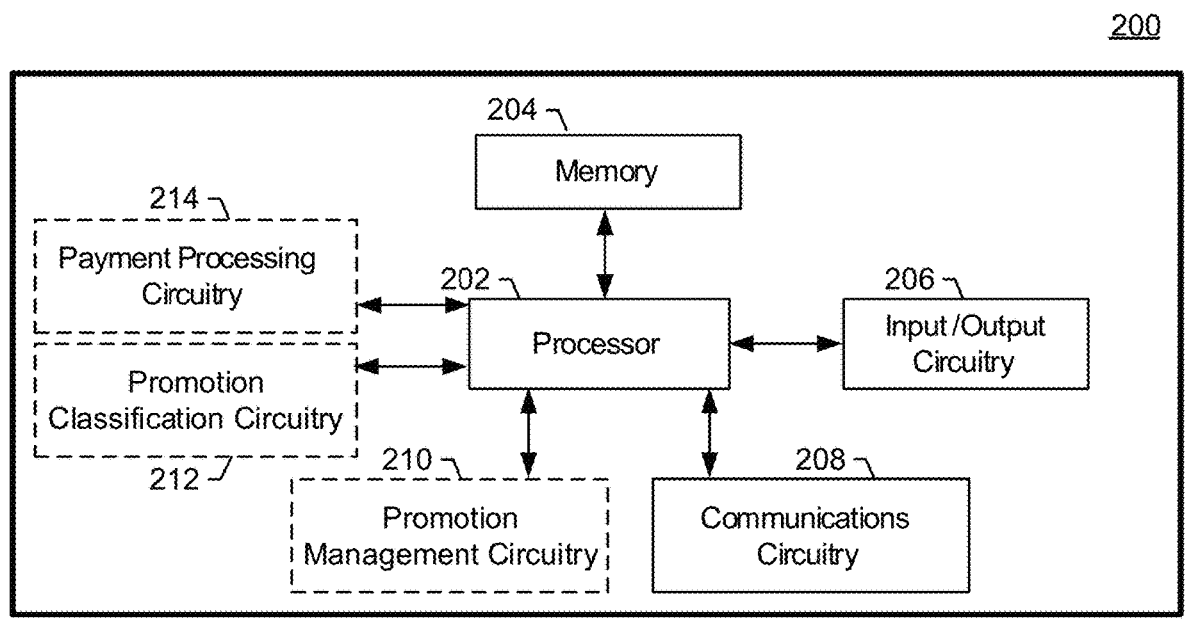
Figure 3A:
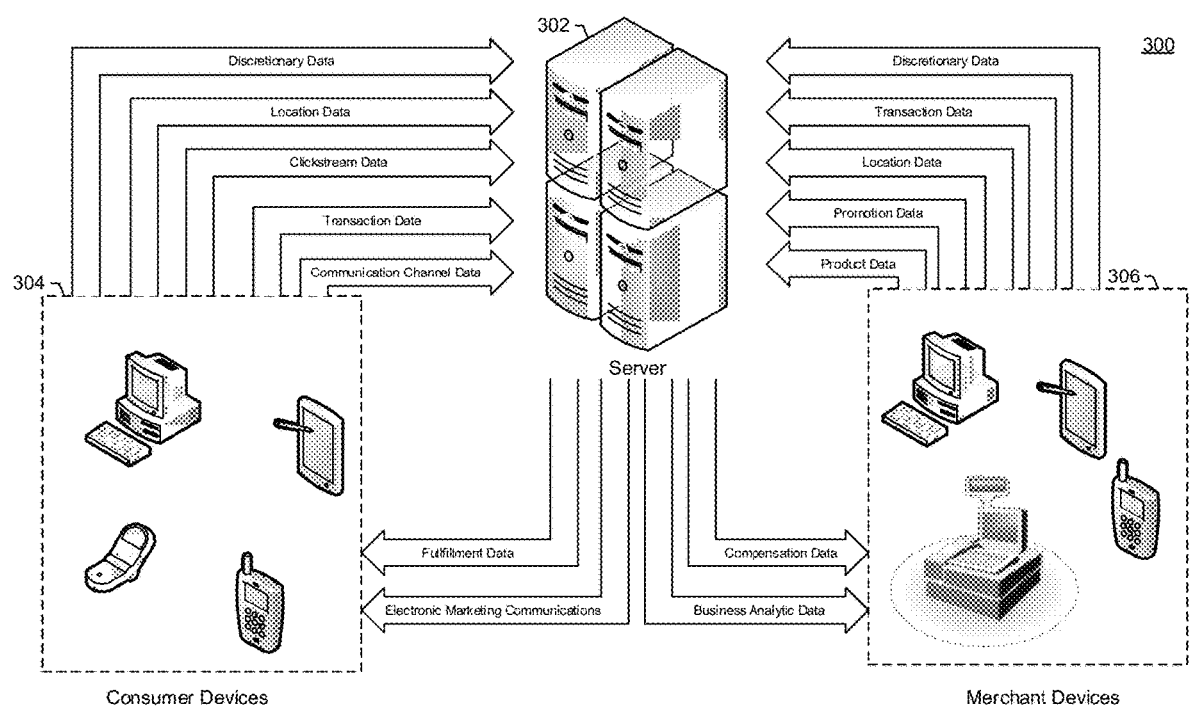
Figure 3B:
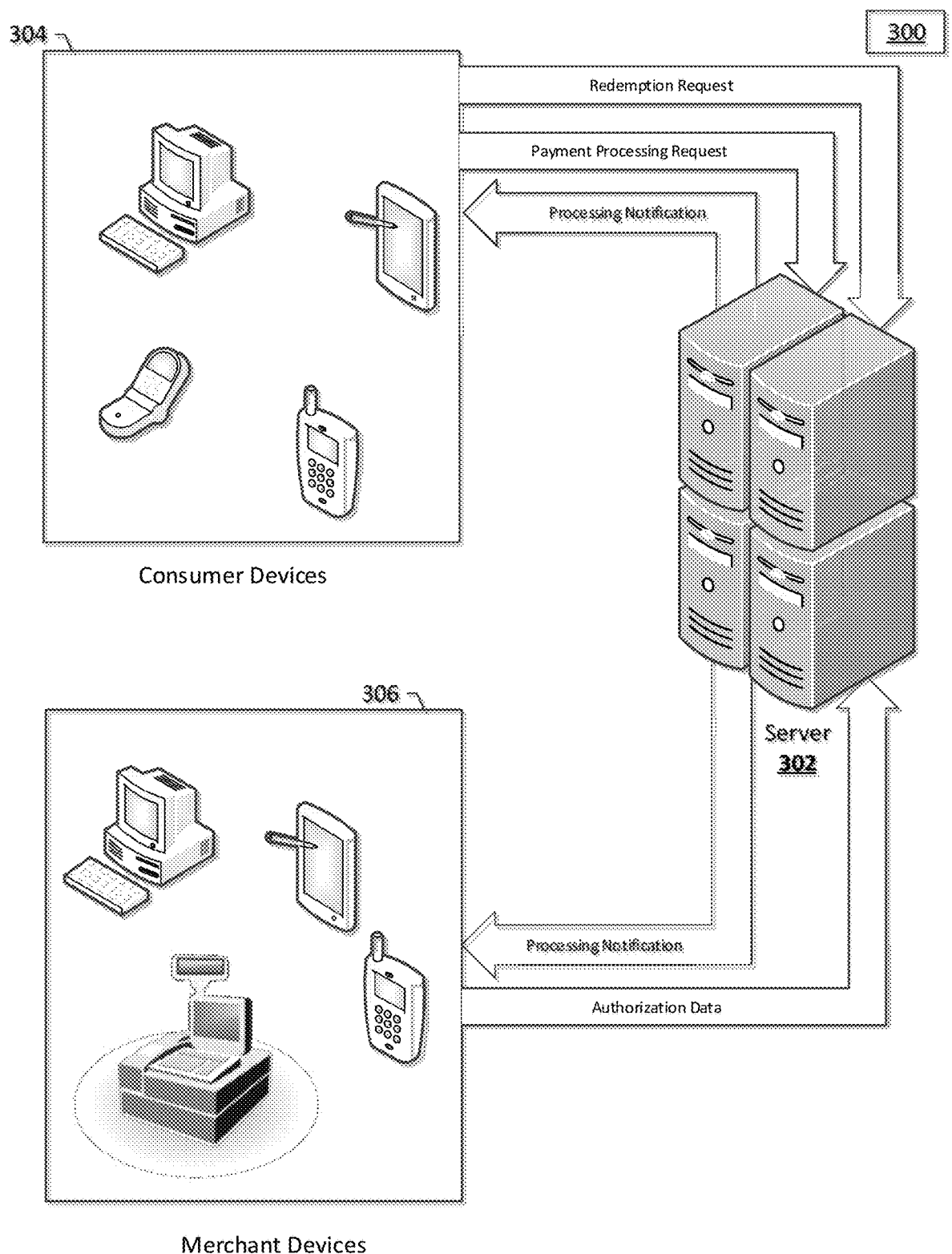
Figure 4A:
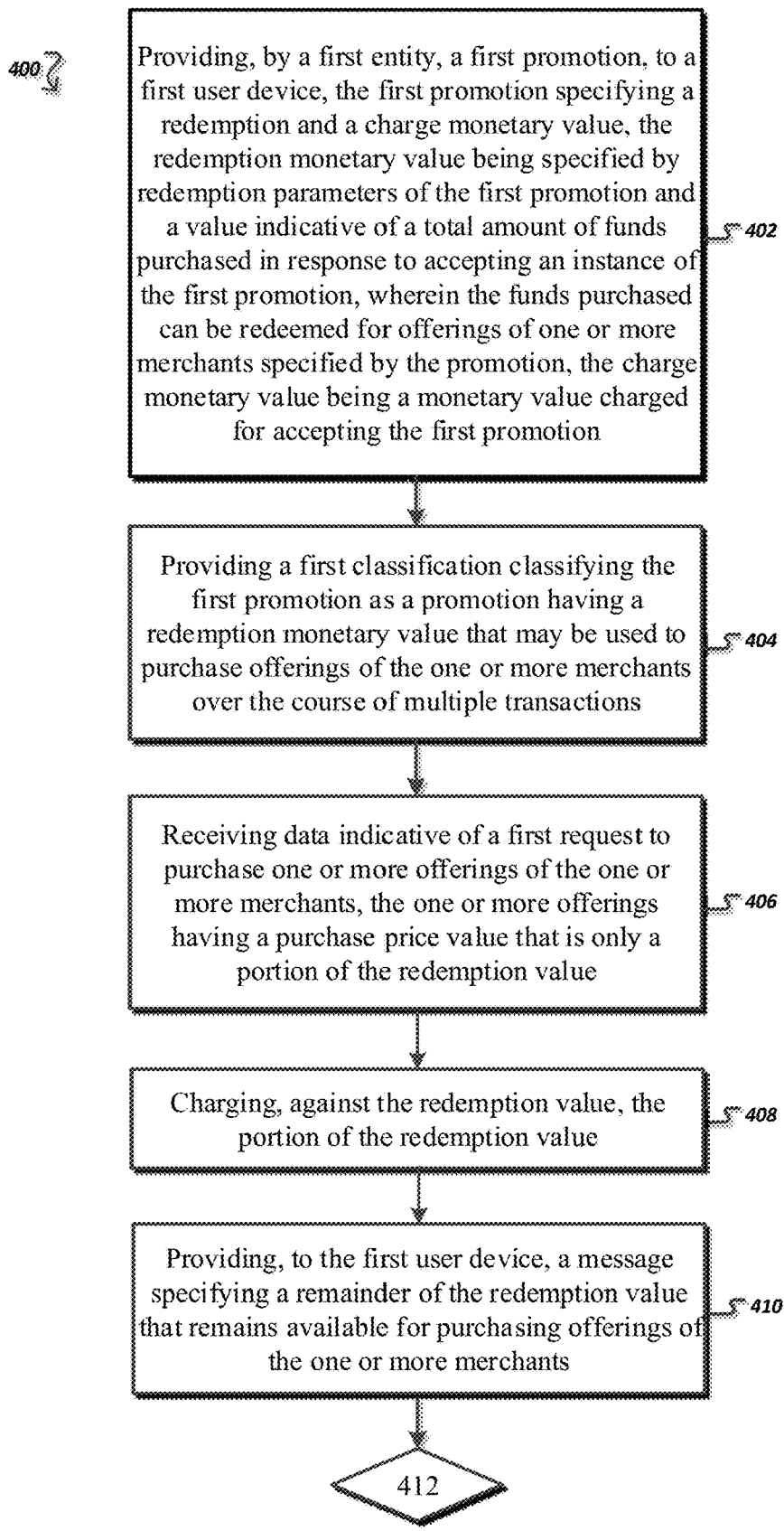
Figure 4B:
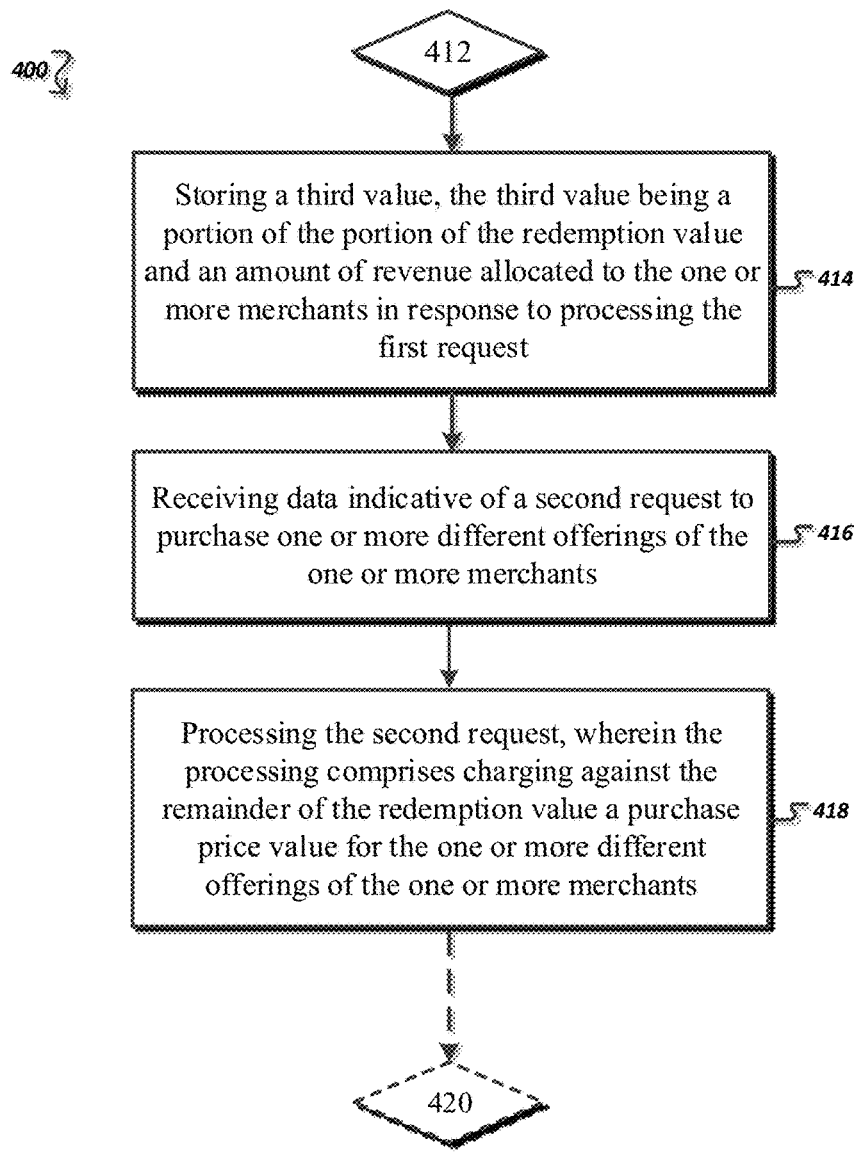
Figure 4C:
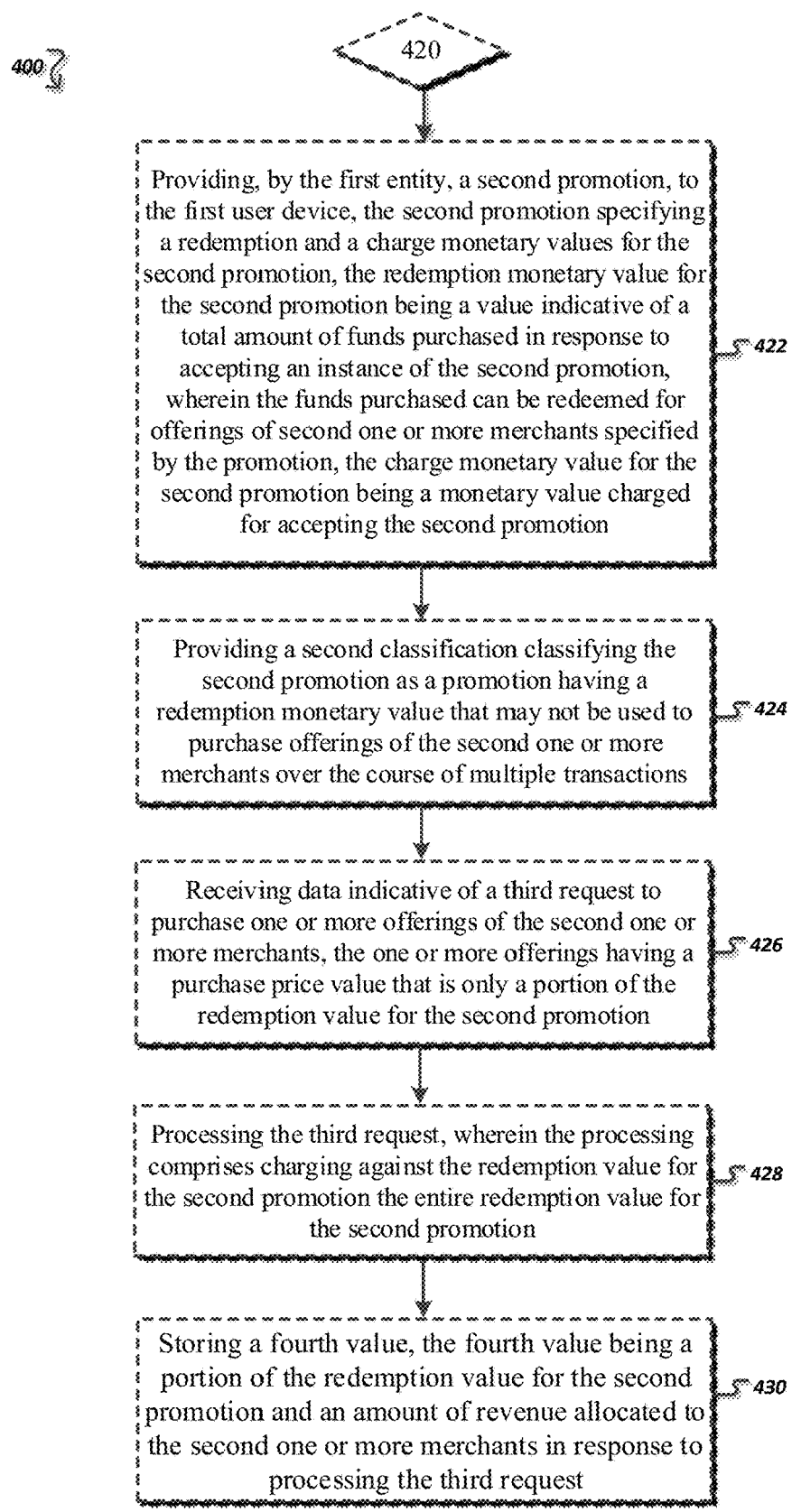
Figure 5:
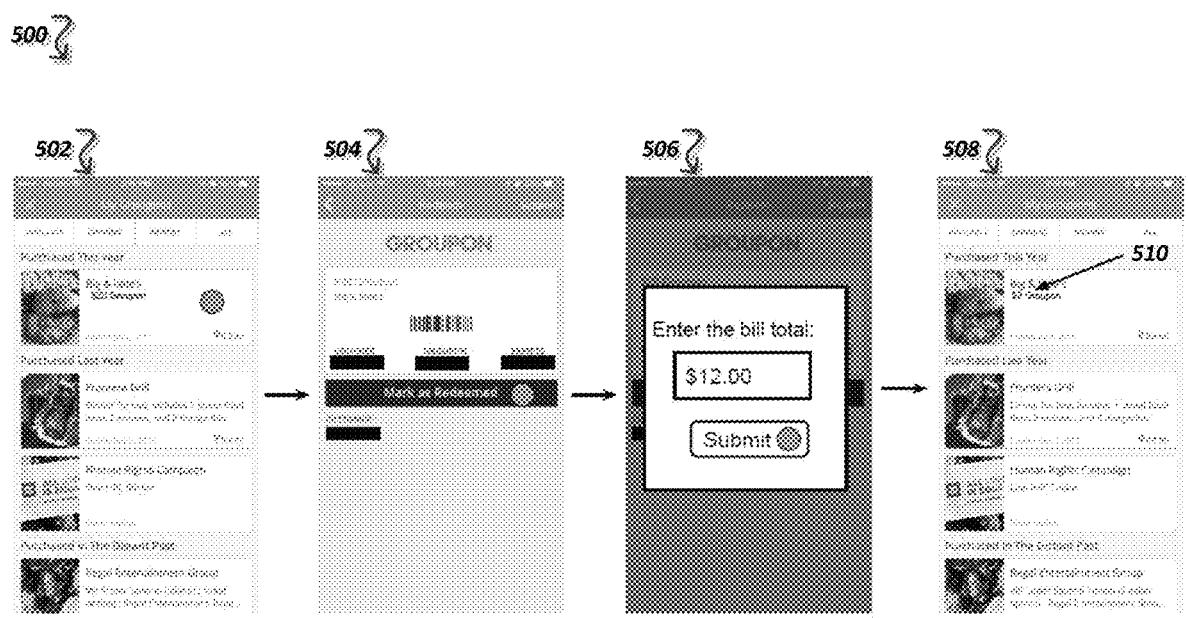

Having thus described the invention in general terms, reference will now be made to the accompanying drawings, which are not necessarily drawn to scale, and wherein:

FIG. 1 is an overview of an example system that can be used to practice embodiments of the present invention;

FIG. 2 is an exemplary schematic diagram of a computing entity according to one embodiment of the present invention;

FIGS. 3A-3B exemplary data flows illustrating interactions between a server, one or more consumer devices, and one or more merchant devices;

FIGS. 4A-4C, and 6-11 are flow charts illustrating various procedures and operations that may be completed in accordance with various embodiments of the present invention; and FIG. 5 depicts an example user interface for purchasing and redeeming promotions according to embodiments of the invention.

Figure 12:
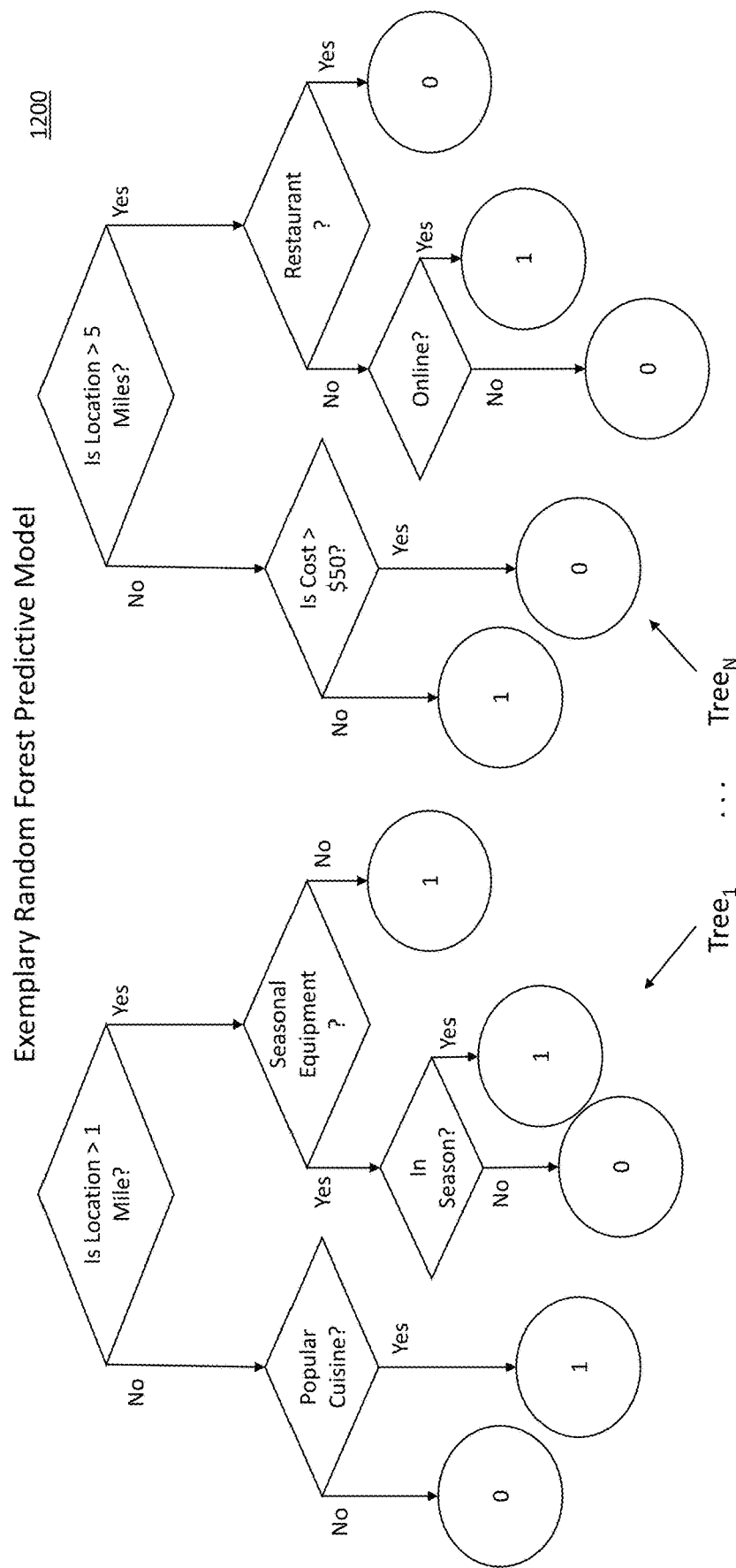

FIG. 12 illustrates an exemplary random forest model.

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

This invention generally relates to offering and processing of promotions. For example, the methods, apparatus and computer program products described herein are operable to allow customers to redeem promotions over the course of multiple transactions. For example, some promotions may be offered to consumers with a classification specifying that each promotion has a monetary value that may be redeemed over the course of multiple transactions. Other promotions may be offered with a classification specifying that the promotions may not be redeemed over the course of multiple transactions. This allows the promotional service to offer promotions to consumers that are better suited for the consumers' needs.

Because analysis shows that some consumers shy away from purchasing promotions because the promotions cannot be redeemed over the course of multiple transactions, allowing the consumers to redeem promotions over the course of multiple transactions would result in more purchases of promotions and, in turn, more revenue.

In one example, a promotional service offering the promotions described above, may process payments for consumers purchasing goods or services from a merchant. For example, the promotional service may allow consumers to redeem a promotion electronically using a mobile device. Similarly, the promotional service may also allow the user to pay for any additional charges owed to the merchant electronically. In turn, the promotional service transfers, at least, a portion of the processed payment to the merchant. In one example, when a user makes a purchase that does not use all of the monetary value of a promotion classified as a promotion that may be redeemed over the course of multiple transactions, the remainder of the monetary value is stored at the promotional service for later redemption by the consumer. The promotional service may provide a message to the consumer indicating the remainder of the monetary value that remains available for redemption. In some implementations, the promotional service may issue a new promotion having a redemption value matching of the remainder.

In one example, two or more users may each use a different promotion to redeem or purchase an offering that may be shared by the two or more users (e.g., restaurant meal). Similarly, the two or more users may share paying for overage charges, using their respective mobile devices. In one example, the promotional service may verify that each request to redeem one or more offerings using a promotion is for an offering allowed by the redemption parameter of said promotion. In some implementations, the promotional service may allow combining of portions of two or more promotions.

In some implementations, the promotional service may dynamically reclassify promotions to increase the sales of said promotions. For example, the promotional service may reclassify a promotion that is not allowed for redemption over the course of multiple transactions, as promotion that is allowed for redemption over the course of multiple transactions, in order to enhance the performance of the promotion. In some implementations, the promotional service may dynamically reclassify promotions to increase the likelihood of a particular consumer purchasing the promotion. In one example, different consumers may receive the same promotion classified with a different classification.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer or a promotion, participate in redemption, generate rewards, provide a point of sale device or service, issue payments to providers and/or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of providing a good, service or experience to a consumer, facilitating the provision of a good service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like. The terms "user" and "consumer" may be used interchangeably through portions of this specification.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like, which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the terms "redemption" and "purchase" refer to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems. Throughout this specification, the terms "user device" and "consumer device" may be used interchangeably.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, it should be appreciated that the examples of discretionary data provided above may also be determined implicitly or through review or analysis of other electronic marketing information provided to the promotion and marketing service. It should also be appreciated that the promotion and marketing service may also grant access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limited to one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in-store only, or that the promotion must be used by a certain date. The redemption parameters may also include monetary values associated with the promotion. For example, a "redemption value" or a "redemption monetary value" may specify a monetary value for the promotion that may be used to redeemed goods and services offered by specified merchants. Similarly, a "charge value" or a "charge monetary value" may specify a monetary value charged for purchasing a promotion. For example, a promotion offering a 50% discount may have a charge value of $10 and redemption value of $20.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including, but not necessarily limited to, offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like, electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling well or that sales of the product or service result in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the terms "merchant self-service indicator" and "promotion context" relate to data associated with the merchant that may be used to classify the merchant or suggest promotion components to the merchant. A promotion context may include a plurality of merchant self-service indicators. For example, a promotion context may include multiple merchant self-service indicators that describe various features or characteristics of the merchant, such as a the type of industry of the merchant, the type of products or services sold by the merchant, the size of the merchant, the location of the merchant, the sales volume of the merchant, reviews and ratings for the merchant, or the like.

In some embodiments, the merchant self-service indicators are a result of analytics that allow for generation of promotions that are ideal for the particular merchant's circumstances. For example, the merchant self-service indicators may be used to identify optimal promotions for the particular merchant based on their exact location (e.g., the particular city street of the merchant as opposed to a wider range, such as a zip code or GPS coordinates), the merchant's exact products and services offered (e.g., pizzerias that only serve deep dish pizza, restaurants that become nightclubs after 11:00 pm), the merchant's price point (e.g., barbershops that charge more than $20 for a haircut), or the date or season of the year (e.g., offering ski equipment during the winter, or holiday themed promotions during the holiday season), or the like. These merchant self-service indicators may be used in a self-service process to identify promotion components that were used by other merchants that share one or more same or similar merchant self-service indicators. For example, after initial registration and verification, the promotion and marketing service may identify the merchant self-service indicators associated with the newly registered merchant, such as by looking up the merchant in a merchant database or by receiving the merchant self-service indicators directly from the merchant (e.g., by a fillable form). The merchant self-service indicators and promotion contexts may be used for classification of merchants. For example, such attributes may be used to identify whether a promotion for a specific merchant is likely to satisfy consumers (e.g., the promotion has 70% chance to satisfy consumers). It should be appreciated that the term "programmatically expected" indicates machine prediction of occurrence of certain events. For example, a "programmatically expected" number of satisfied users is a number determined by machine prediction specifying the expected number of users that will be satisfied with a promotion.

As used herein, the term "likelihood" refers to a measure of probability for occurrence of a particular event. For example, the likelihood that a customer is satisfied with a promotion may be a value associated with a specific scale. In some implementations, the machine predictions discussed above are based, at least in part, on the "likelihood" that an event will occur. Similarly, in some implementations, machine predictions are based on attributes associated with a merchant and an associated merchant promotion.

It should be appreciated that the terms "refund," "return," and "termination of an accepted promotion" imply canceling/reversal of a promotion that was accepted. For example, a user terminating, returning, and/or requesting a refund for an accepted promotion may be described by the act of returning goods or services received while requesting return of a purchase price for the promotion. In some implementations, the user may merely return, cancel, or void an electronic voucher or tender for a service or goods in exchange for a refund of a price paid by the user for an associated promotion.

As used herein, the term "offerings" refers to goods, services, experiences or the like that are offered by an entity. For example, a merchant may offer a wide variety of offerings including tangible goods (e.g., food items, camping equipment, clothing), services (e.g., car services, hair salon services, spa services), or experiences (e.g., movies, theme parks, concerts).

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like, of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process.

However, these promotion and marketing services are not without problems. Although, the above provide means for providing consumers with tailored promotions, the inventors have determined that specific aspects of promotions can detrimentally affect the consumers' satisfaction. For example, redemption parameters for promotions that limit the ability to redeem a portion of the promotion can generally reduce the consumer satisfaction and, in turn, the number of promotions sold. The inventors have determined that existing techniques may not always leverage this information in an efficient or accurate manner. Technology continues to rapidly advance in this field offering improvements that enhance the consumer experience. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints redeeming a promotion over the course of multiple transactions, redeeming two or more promotions belonging to different consumers simultaneously, redeeming promotions and paying for overage charges using a single interface on a single device, providing means for determining remainder redemption values of a promotion, authorizing use of a promotion according to the promotion's redemption parameters. The inventors have identified that these constraints are not contemplated in the world of paper coupons, as these constraints cannot be overcome with respect to paper coupons and processing systems. For example, paper coupons are redeemed by marking them as used or by collecting the coupon itself without any communication with the promotion and marketing service. The inventors have further determined that such technological methods that leverage offering and processing of paper coupons fail to address problems associated with the ability to create a live connection between consumer devices and the promotional and marketing service, and the ability integrate with point of sale, so as to redeem a portion of promotions. Embodiments of the present invention as described herein serve to correct these errors and offer improved resource utilization, thus providing improvements to electronic offering and processing that address problems arising out of the electronic nature of those services.

The inventors have identified that the offering promotions that cannot be redeemed over the course of multiple transactions causes some consumers to avoid purchasing promotions. On many occasions, the value of a promotion exceeds the value of goods and/or services that are of interest to consumers. As a result, consumers are often forced to either forfeit a portion of their voucher or purchase items that are not of interest. This degrades the consumer experience, and results in reduced consumer interest in promotions. The inventors have also identified that allowing consumers to redeem their promotions and pay for any additional charges electronically, using their mobile devices, can greatly improves the consumers' experience. However, these processing features are lacking in current processing systems, as described.

The inventors have therefore determined that existing electronic systems for offering and processing of promotions fails to efficiently address these issues. As a result of these problems and others that may arise from time to time, delays and inefficiencies may be introduced into the offering and processing of promotions process, which in turn may be reflected on consumer satisfaction and overall revenue generated. The inventors identified an offering and processing methodologies that allow consumers to redeem promotions electronically over the course of multiple transactions as well as process payments owed to merchants electronically. As result, the predictions and classifications above may be utilized to significantly improve the consumer experience, the merchant experience, and increase the overall revenue associated with offering promotions.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic information among one or more consumer devices, merchant devices, and the promotion and marketing service is described below with respect to FIG. 3.

Example Apparatus for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, promotion management circuitry 210, promotion classification circuitry 212, and promotion payment processing circuitry 214. The apparatus 200 may be configured to execute the operations described above with respect to FIG. 1 and below with respect to FIGS. 3-10. Although these components 202-214 are described with respect to functional limitations, it should be understood that the particular implementations necessarily include the use of particular hardware. It should also be understood that certain of these components 202-214 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Promotion management circuitry 210 includes hardware configured to offer and manage promotions. The promotion management circuitry 210 may utilize processing circuitry, such as the processor 202, to perform these actions. The promotion management circuitry 210 may receive data from promotion classification circuitry 212. In some implementations, the received data may be a classification specifying whether a promotion may be redeemed over the course of multiple transactions. For example, a classification may specify that a promotion may be redeemed over the course of multiple transactions. In some implementations, the promotion management circuitry 210 is responsible for determining whether a promotion expired, or was previously used. In some implementations, the promotion management circuitry 210 determines the remainder value that may still be redeemed for a promotion classified as a promotion may be redeemed over the course of multiple transactions.

It should also be appreciated that, in some embodiments, the promotion management circuitry 210 may include a separate processor, specially configured field programmable gate array (FPGA), or application specific interface circuit (ASIC) to offer and manage promotions. In some implementations, promotion classification circuitry 212, described below, may be sub-circuitry belonging to promotion management circuitry 210. The promotion management circuitry 210 may be implemented using hardware components of the apparatus configured by either hardware or software for implementing these planned functions.

Promotion classification circuitry 212 includes hardware configured to maintain classifications for promotions offered through the promotional service. In some implementations, the classifications specify whether a promotion may be redeemed over the course of multiple transactions. In some implementations, the classifications specify whether a promotion may be redeemed at multiple merchants. In some implementations, the classifications specify whether a promotion may be redeemed over the course of multiple transactions and at multiple merchants. As described above, the classifications for promotions may be provided to promotion management circuitry 210 in response to a request. The promotion classification circuitry 212 may utilize processing circuitry, such as the processor 202, to perform these actions. However, it should also be appreciated that, in some embodiments, the promotion classification circuitry 212 may include a separate processor, specially configured field programmable gate array (FPGA), or application specific interface circuit (ASIC) for maintain promotion classifications and providing the classifications to promotion management circuitry 210. Similarly, payment processing circuitry 214 includes hardware configured to process payment and facilitate redemption of promotions. In some implementations, the payment processing circuitry 214 allow consumers to process payments owed to merchants. In some implementations, the payment processing circuitry 214 allow consumers to redeem promotions electronically. In some implementations, the payment processing circuitry, receives consumer payment information transferred from a consumer device. Again, it should also be appreciated that, in some embodiments, the payment processing circuitry 214 may include a separate processor, specially configured field programmable gate array (FPGA), or application specific interface circuit (ASIC) for processing of payments and promotions. Circuitry 212 and 214 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3A depicts an example data flow 300a illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300a illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, historical data, review data and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximizing the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated, however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

FIG. 3B depicts an example data flow 300b illustrating interactions between a server 302, one or more consumer devices 304, and one or more merchant devices 306. Data flow 300b is generally similar to data flow 300a. In particular, data flow 300a illustrates interactions, associated with exemplary process 600 of FIG. 6, and FIG. 8, between the server 302, consumer devices 304 and merchant devices 306. For example, as will be described in more detail below, the consumer devices 304 may provide a redemption request and/or a payment processing request to server 302. The redemption request may be for redeeming one or more promotions. The payment processing request may be for processing a payment transaction associated with the redemption request. In some implementations, the payment processing request includes data specifying payment information of a respective user of a consumer device 304. For example, the request may include credit card information of a user of one of the consumer devices 304.

Merchant devices 306 may receive processing notifications from server 302. For example, in response to receiving the redemption request and the payment processing request, the server 304 may provide a notification to a merchant device 306, indicating that server 304 received the requests. In turn, the merchant device 306 may provide authorization data to the server 304, authorizing processing of redemption request and/or the payment processing request. At this point, the server 304 may perform operations associated with the redemption and/or the payment processing requests. In response to successfully processing the redemption request and/or the payment processing request, the server 304 may provide, to consumer device 304 and the merchant device 306, notifications indicating that the processing of the redemption and/or payment processing requests are successful.

Embodiments advantageously provide for improvements to merchant devices by eliminating or reducing the promotion and payment processing required by the merchant machines. For example, allowing consumers to redeem promotions and process payments through the promotional service reduces the processing power requirement of the merchant devices. Since these processing operations would be otherwise performed by the merchant devices, the stress on the merchant devices is reduced.

Example Processes for Offering and Processing Promotions

FIG. 4 is a flow chart of an example process 400 for offering and processing promotions. The process 400 begins with providing, by a first entity, a first promotion, to a first user device, the first promotion specifying a redemption and a charge monetary values, the redemption monetary value being specified by redemption parameters of the first promotion and a value indicative of a total amount of funds purchased in response to accepting an instance of the first promotion, wherein the funds purchased can be redeemed for offerings of one or more merchants specified by the promotion, the charge monetary value being a monetary value charged for accepting the first promotion (402). For example, the first entity may be a promotional service that offers or provides consumers with various types of promotions and promotional deals. In some implementations, a promotion may have a redemption value that is a monetary value that may be used to redeem goods and services offered by merchants specified by redemption parameters for the promotion. Similarly, a promotion may have a charge value that is a monetary value that is charged for purchasing the promotion. For example, a promotion offering a 75% discount may have a charge value of $10 and a redemption value of $40. Accordingly, a consumer may redeem goods and services that are worth $40 while only purchasing the promotion for $10. Merchants specified by redemption parameters of promotions may offer a wide variety of products, goods, and services. For example, the merchant may be a department store that is requesting transmittal of a promotion for goods (e.g., clothing, shoes, toys, food items, camping equipment) offered by the department store. In some implementations, the promotion may be for any of the goods offered by the department store. In some implementations, the promotion may be for a specific type of goods offered by the department store (e.g., camping equipment). In some implementations, the promotion may be for a specific item, such as, a bike. Similarly, the merchant may be a service store, such as a hair salon or a car repair shop. In such implementations, the promotions may be for services provided by the store (e.g., haircut, hair coloring, oil change). In some implementations, stores may offer a combination of services and goods.

The process 400 continues with providing a first classification classifying the first promotion as a promotion having a redemption monetary value that may be used to purchase offerings of the one or more merchants over the course of multiple transactions (404). For example, with reference to the hair salon example and the promotion having a charge value of $10 and a redemption value of $40, the promotion may be for redemption at the hair salon and may be classified as a promotion that may be redeemed over the course of multiple transactions. Similarly, the promotion having a charge value of $10 and a redemption value of $40, may be for redemption at the department store and may be classified as a promotion that may be redeemed over the course of multiple transactions.

The process 400 continues with receiving data indicative of a first request to purchase one or more offerings of the one or more merchants, the one or more offering having a purchase price value that is only a portion of the redemption value. For example, with reference to the hair salon example above, a haircut may only cost $18. A consumer may wish to purchase the haircut using the promotion having a charge value of $10 and a redemption value of $40. Naturally, the $18 value is only a portion of the $40 redemption value. Similarly, the consumer may wish to purchase goods from the department store only costing $20. In turn, the process 400 charges, against the redemption value, the portion of the redemption value (408). For example, the process 400 may charge the $18 for the hair cut against the $40 value. Similarly, the process 400 may charge the $20 for the goods from the department store against the $40 value. In some implementations, the process 400 may validate that the one or more offerings the consumer is requesting to purchase are eligible for redemption using the first promotion, prior to processing the charge. For example, the first promotion may be for redemption only at the hair salon described above. Accordingly, the process 400 would process the charge associated with the request to purchase a haircut using the first promotion. Similarly, the process 400 would not process the charge associated with the request to purchase a bike using the first promotion. In some implementation, the process 400 is terminated in response receiving a request that fails the validation process above. In some implementations, the process 400 may require receipt of an authentication, authenticating an identity of the user providing the request, the identity of the first user device, and the authenticity of the promotion (e.g., fraudulent promotion).

The process 400 continues with providing, to the first user device, a message specifying a remainder of the redemption value that remains available for purchasing offerings of the one or more merchants (410). For example, the process 400 may provide a message specifying the remainder of the $40, after charging the purchase price value against redemption value, for display on a user device of the consumer. With reference to the hair salon example, the process 400 may provide a message specifying that the remainder available for purchasing offerings of the hair salon is $22. Similarly, with reference to the department store example, the process 400 may provide a message specifying that the remainder available for purchasing offerings of the department store is $20. In some implementations, the remainder available for purchasing offerings may be used to purchase offerings of a different merchant. For example, using the promotion to purchase or redeem the hair cut form the hair salon, the consumer may use the remainder of the redemption value to purchase or redeem goods offered by the department store. The process 400 continues at FIG. 4B (412).

The process 400 continues with storing a third value, the third value being a portion of the portion of the redemption value and an amount of revenue allocated to the one or more merchants in response to processing the first request (414). In some implementations, in response to every promotion redemption, a first portion of revenue associated with the redemption is allocated to the merchant while a second portion is allocated to the promotional service. The ration of the first portion to the second portion varies depending on one or more agreements between the promotional service and the merchant. For example, the merchant may be allocated half of the revenue, and the promotional service may be allocated half of the revenue. Different ratios of allocation may be used to suit the business needs of the promotional service and the merchant. For example, with respect to the haircut example above, the stored value specifying the revenue of the merchant may be $1.5 in response to the redemption of the first haircut.

In due time, the process 400 may receive data indicative of a second request to purchase one or more different offerings of the one or more merchants (416). For example, with reference to the hair salon example, the process 400 may receive a second request to use the same promotion to purchase or redeem a second haircut. Similarly, with respect to the department store example, the request may be for redemption of other goods different from the goods previously redeemed. In turn the process 400 processes the second request, wherein the processing comprises charging against the remainder of the redemption value a purchase price value for the one or more different offerings of the one or more merchants (418). For example, a second $18 may be charged against the remainder of $22 for the second haircut at the hair salon. After charging the $18 against the remainder, $4 may still remain available for redemption. In some implementations, the remaining $4 may be used to redeem other goods or services offered by the hair salon. In some implementations the $4 may be used to purchase other promotions. In some implementations, the $4 may be combined with other remainders from other promotions. In some implementations, the $4 may be rolled over into a newly purchased promotion having the same or similar redemption parameters. In some implementations, the $4 may be returned to the promotional service for a refund of, at least, a portion of the $4. For example, the user may void the remaining $4 in exchange for $1 from the promotional service. In some implementations, the process 400 continues with the optional steps, shown in phantom or dashed lines, on FIG. 4C (420). In some implementations, the process 400 ends at step 418.

In some implementations, the process 400 may optionally continue with providing, by the first entity, a second promotion, to the first user device, the second promotion specifying a redemption and charge monetary values for the second promotion, the redemption monetary value for the second promotion being a value indicative of a total amount of funds purchased in response to accepting an instance of the second promotion, wherein the funds purchased can be redeemed for offerings of second one or more merchants specified by the promotion, the charge monetary value for the second promotion being a monetary value charged for accepting the second promotion (422). For example, the second promotions may be similar to the promotion described with reference to 402.

In some implementations, the process 400 may optionally continue with providing a second classification classifying the second promotion as a promotion having a redemption monetary value that may not be used to purchase offerings of the second one or more merchants over the course of multiple transactions (424). For example, the classification of the second promotion may specify that the promotion is void after being used for a first transaction. Therefore, a second promotion having a charge value of $10 and a redemption value of $40 becomes void after the first transaction, according to the second classification. The process 400 may, optionally, receive data indicative of a third request to purchase one or more offerings of the second one or more merchants, the one or more offerings having a purchase price value that is only a portion of the redemption value for the second promotion (426). The second promotion may also be for redemption at a hair salon or a department store. For example, if the second promotion is used to redeem or purchase the $18 haircut described above with respect to the hair salon example, the consumer would forfeit a $22 value. Accordingly, consumers are encouraged to make purchases or redemptions that match or exceed the $40 value, in order to maximize the benefit of the second promotion. Similarly, if the second promotion is used to redeem or purchase the $20 goods, described above, at the department store, the user would be forced to forfeit $20 from the redemption value of the second promotion.

The process 400 may, optionally, continue with processing the third request, wherein the processing comprises charging against the redemption value for the second promotion the entire redemption value for the second promotion (428). For example, the process 400 may charge the $40 redemption value against the $40 redemption value purchasing or redeeming the hair cut prices at $18 or the department store goods priced at $20. Similarly, the $40 redemption value is completely consumed in response to processing any transaction benefiting from the second promotion.

Finally, the process 400 may, optionally, end with storing a fourth value, the fourth value being a portion of the redemption value for the second promotion and an amount of revenue allocated to the second one or more merchants in response to processing the third request (430). In some implementations, merchants receive a fixed amount of revenue for promotions classified with the second classification. For example, the merchant may receive $4 for each redemption of the promotions having the second classification, the redemption value of $40, and the charge value of $10. In other implementations, merchants receive a portion of the revenue, specified by a ratio. For example, the merchant may receive 30% of the revenue associated with redemption of the second promotion. The value of the merchant's portion of revenue is stored. In some implementations, each merchant receives their collective portions of revenue from the promotional service periodically. For example, a merchant may receive their portion of revenue at the end of every month, week, or day. In some implementations, the merchant may receive their portion of revenue for transactions, in response to processing each transaction.

Example User Interface for Facilitating Various Aspects of the Invention

FIG. 5 depicts an example user interface 500 for purchasing and redeeming promotions according to embodiments of the invention. In some implementations, the user interface may provide an indication specifying whether a promotion available for purchase may be used over the course of multiple transactions. In some implementations, the user interface element 502 provides consumers with a list of purchased promotions. In some implementations, the promotions are grouped based on a respective time of purchase. For example, promotions purchased last month may be grouped. Similarly, promotions purchased last year may also be grouped. In some implementations, the user is provided with user interface element 504 specifying various details regarding the purchased promotion. For example, the user interface element 504 may display a unique number and barcode for the purchased promotion. The consumer may also use user interface element 504 to display an element for initiating redemption of the promotion. In response to initiation of redemption of the promotion, user interface element 506 may be displayed. User interface element 506 may include an element for receiving a total amount the consumer wishes to pay. The total amount may include, for example, a price for goods purchased and a monetary value for a tip. In some implementations, the total amount is less than the redemption value of the promotion. In such implementation, user interface element 508 may be displayed. In some implementations, user interface element 508 specifies the remainder value 510 for the promotion as described above with respect to FIGS. 4A-4C. In some implementations, the redemption value of the promotion may be less than the price of goods to be purchased. In such implementations, a user interface element for processing a payment may be displayed. The consumer may specify a monetary amount to be processed. User interface element 508 may, then, specify that the promotion is void, or that the remainder value 510 is $0. In some implementations, the user interface 500 may facilitate other steps and functions described in this application.

Example Processes for Processing Payments Associated with Promotion Redemption

Figure 6:
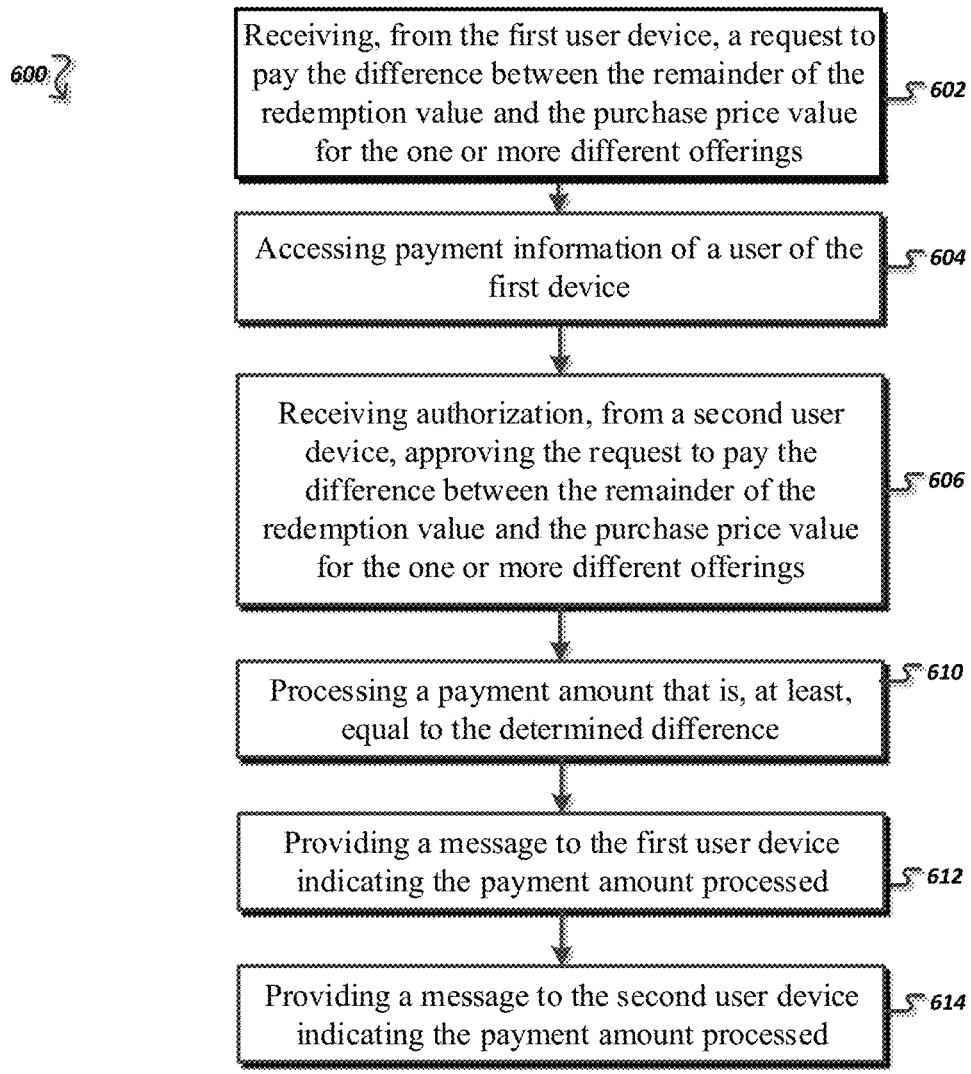

FIG. 6 is a flow chart illustrating an example process 600 for processing payments associated with redemption of a promotion. For example, the process 600 can be incorporated in user interface 500 for redemption of promotions. The process 600 begins with receiving, from the first user device, a request to pay the difference between the remainder of the redemption value and the purchase price value for the one or more different offerings (602). For example, with reference to the hair salon example above, a consumer may be redeeming a promotion having a $15 redemption value for an $18 priced haircut. The consumer may use user interface 500 to request to pay the difference ($2) between the redemption value and the price of the haircut. In some implementations, the consumer may provide his/her payment information using user interface 500. In some implementations, the consumer may have previously provided his/her payment information for storage at servers of the promotional service. The process 600 continues with accessing payment information of a user of the first device (604). For example, the process 600 may access payment information of the consumer using user interface 500 on a mobile device of the consumer. The consumer may provide using the mobile device data specifying a total amount of payment to be processed. In some implementations, the total amount of payment may include a tip.

The process 600 continues with receiving, authorization, from a second user device, approving the request to pay the difference between the remainder of the redemption value and the purchase price value for the one or more different offerings (606). For example, with reference to the hair salon example above, an attendant (e.g., hair stylist, a hair salon receptionist, a cashier) may receive, at a second mobile device, an indication that the consumer imitated a process to pay the difference using user interface 500. In some implementations, the attendant may receive and review, at the second mobile device, the payment data and in response accept processing of the payment (610). In turn, the process 600 processes a payment amount that is, at least, equal to the determined difference. In some implementations, the process 600 processes a payment amount that is equal to the determined difference in addition to a consumer specified tip. After processing the payment, the process 600 provides a message to the first user device indicating that the payment amount was processed successfully (612). For example, with reference to the hair salon example, the consumer may receive a message specifying that the $2 difference was processed successfully. Similarly, if the consumer used user interface 500 to provide an additional $3 tip, the message would indicate that $5 was processed successfully. The process 600 finally provides a message to the second user device indicating the payment amount processed (614). For example, the process 600 may provide a message to the mobile device of the hair salon attendant specifying that the $2 difference was processed successfully. Similarly, the message may specify that an additional $3 tip was also processed successfully. As described above, the promotional service may provide a portion of the revenue associated with processed payment to the hair salon.

Figure 7:
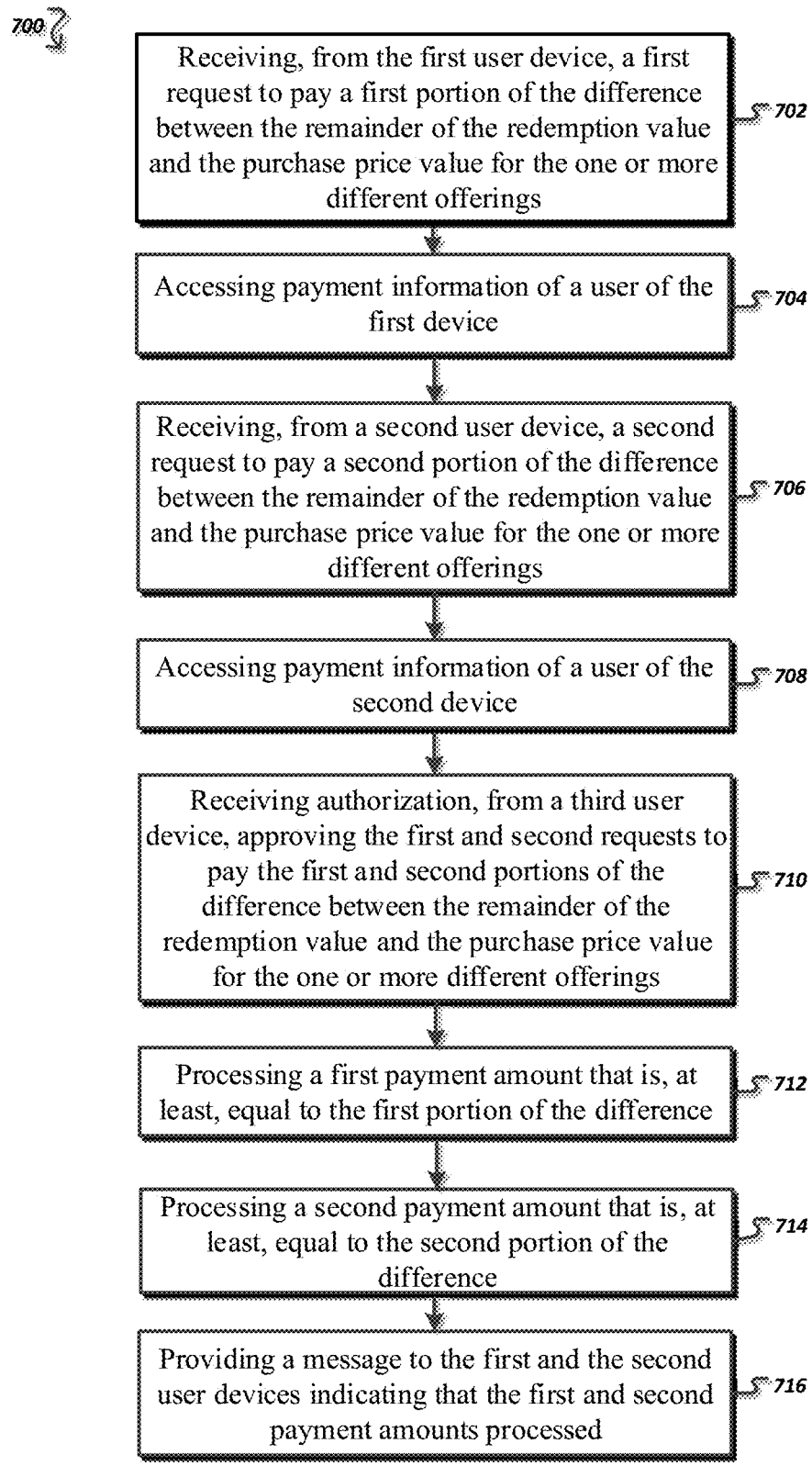

FIG. 7 is a flow chart illustrating an example process 700 for processing payments, from multiple user devices of multiple consumers, associated with redemption of a promotion. For example, the process 700 can be incorporated in user interface 500 for redemption of promotions. The process 700 begins with receiving, from the first user device, a request to pay a first portion of the difference between the remainder of the redemption value and the purchase price value for the one or more different offerings (702). For example, two consumers may be dining at a restaurant, the promotion having the $40 redemption to redeem a shared meal at the restaurant. The total price of the meal may be, for example, $50. In such case, the difference between the redemption value and the total price for the meal is $10. In one example, the first user may request to pay $5 of the difference. In a different example, the user may request to pay $3. Yet in a different example, the user may request to pay $5 in addition to a $6 tip. In some implementations, the consumer may provide his/her payment information using user interface 500. In some implementations, the consumer may have previously provided his/her payment information for storage at servers of the promotional service. The process 700 continues with accessing payment information of a user of the first device (704). For example, the process 700 may access payment information of the consumer using user interface 500 on a mobile device of the consumer. The consumer may provide using the mobile device data specifying a total amount of payment to be processed.

The process 700 continues with receiving, from a second user device, a second request to pay a second portion of the difference between the remainder of the redemption value and the purchase price value for the one or more different offerings (706). For example, with respect to the restaurant example above, the second user may request to pay $5 of the difference. In one example, the second user may request to pay $7. In a different example, the second user may request to pay $5 and an additional $4 tip. In some implementations, the consumer may provide his/her payment information using user interface 500. In some implementations, the consumer may have previously provided his/her payment information for storage at servers of the promotional service. The process 700 continues with accessing payment information of a user of the second device (708). For example, the process 700 may access payment information of the consumer using user interface 500 on a mobile device of the consumer. The consumer may provide using the mobile device data specifying a total amount of payment to be processed.

The process 700 continues with receiving authorization, from a third user device, approving the first and second requests to pay the first and second portions of the difference between the remainder of the redemption value and the purchase price value for the one or more different offerings (710). For example, a waiter at the restaurant may provide authorization from his/her mobile device indicating approval of the first and second requests described above. Once the authorization is received, the process 700 processes a first payment amount that is, at least, equal to the first portion of the difference (712). For example, the process 700 may process a payment of $5 from the first consumer. In some implementations, an additional tip amount is also processed. For example, the process 700 may process an additional $6 as a tip for the waiter according to first user input at the first user device. Similarly, the process 700 processes a second payment amount that is, at least, equal to the second portion of the difference (714). For example, the process 700 may process a payment of $5 from the second consumer. In some implementations, an additional tip amount is also processed. For example, the process 700 may process an additional $4 as a tip for the waiter according to second user input at the second user device.

Figure 8:
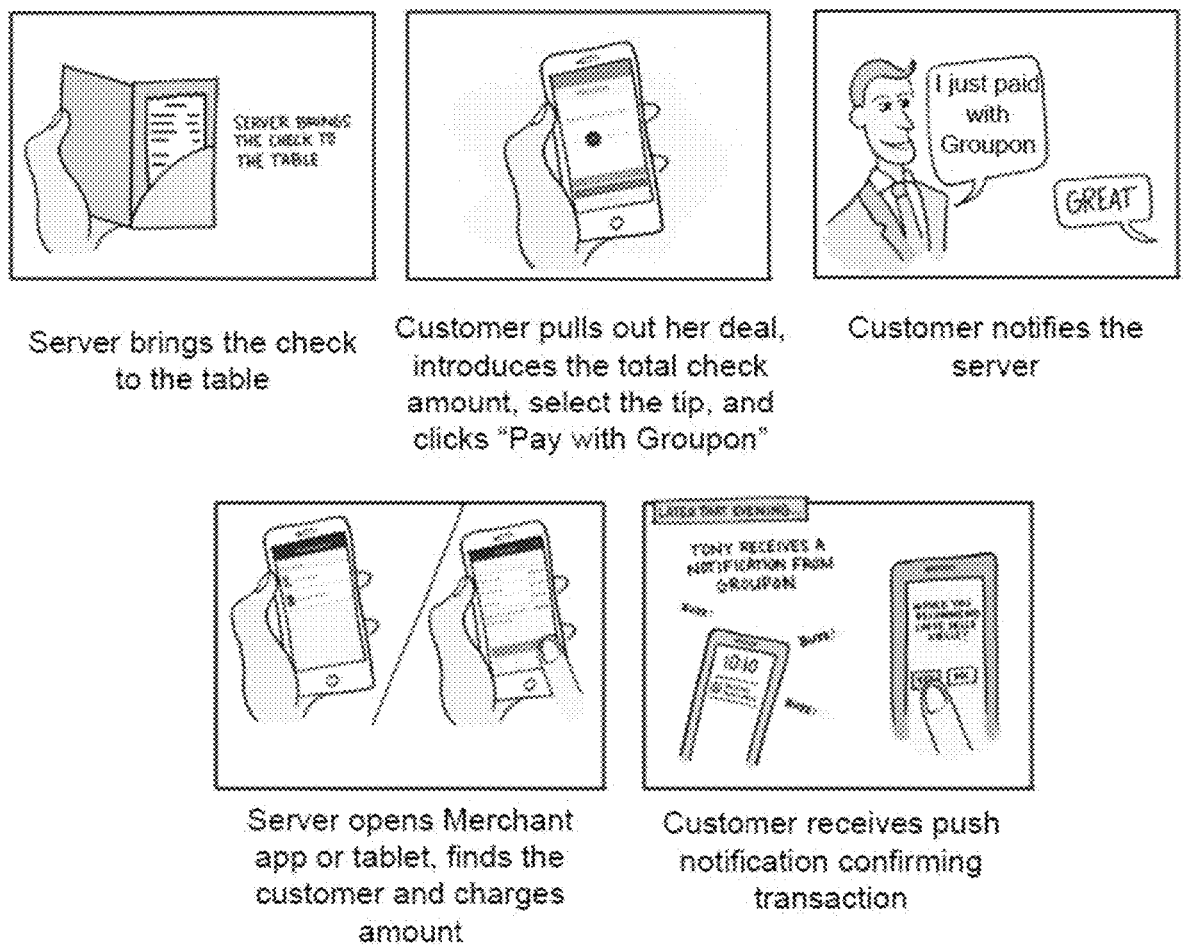

Finally the process 700 ends with providing a message to the first and the second user devices indicating that the first and second payment amounts processed (716). In some implementations, the process 700 provides the first consumer with a message indicating the first payment amount processed. Similarly, in some implementations, the process 700 provides the second consumer with a message indicating the second payment amount processed. In some implementations, the process 700 provides both the first and second consumers messages indicating the first and second amounts processed. In some implementations, the process 700 provides the third user device with a message indicating the first and second payment amounts. For example, the waiter may receive, at the third user device that provided the authorization above, a message indicating the first and second payment amounts. In some implementations, the first and second consumers receive a request to provide a rating for the merchant that the promotion was redeemed at. For example, the first and second consumers may receive a message requesting a rating for the restaurant. In some implementations, the consumers can dismiss the message without providing a rating. In some implementations, one or more of the messages above may be a push notification. In some implementations, a process similar to process 700 may be used to process a first promotion belonging to a first and a second promotion belonging to a second user for payment shared goods. For example, the first and second users may use the first and second promotions to jointly redeem a shared meal, as described above. FIG. 8 depicts a graphical illustration of steps included in processing payments associated with redemption of a promotion as discussed above with reference to processes 600 and 700.

Example Processes for Combining Promotions

Figure 9:
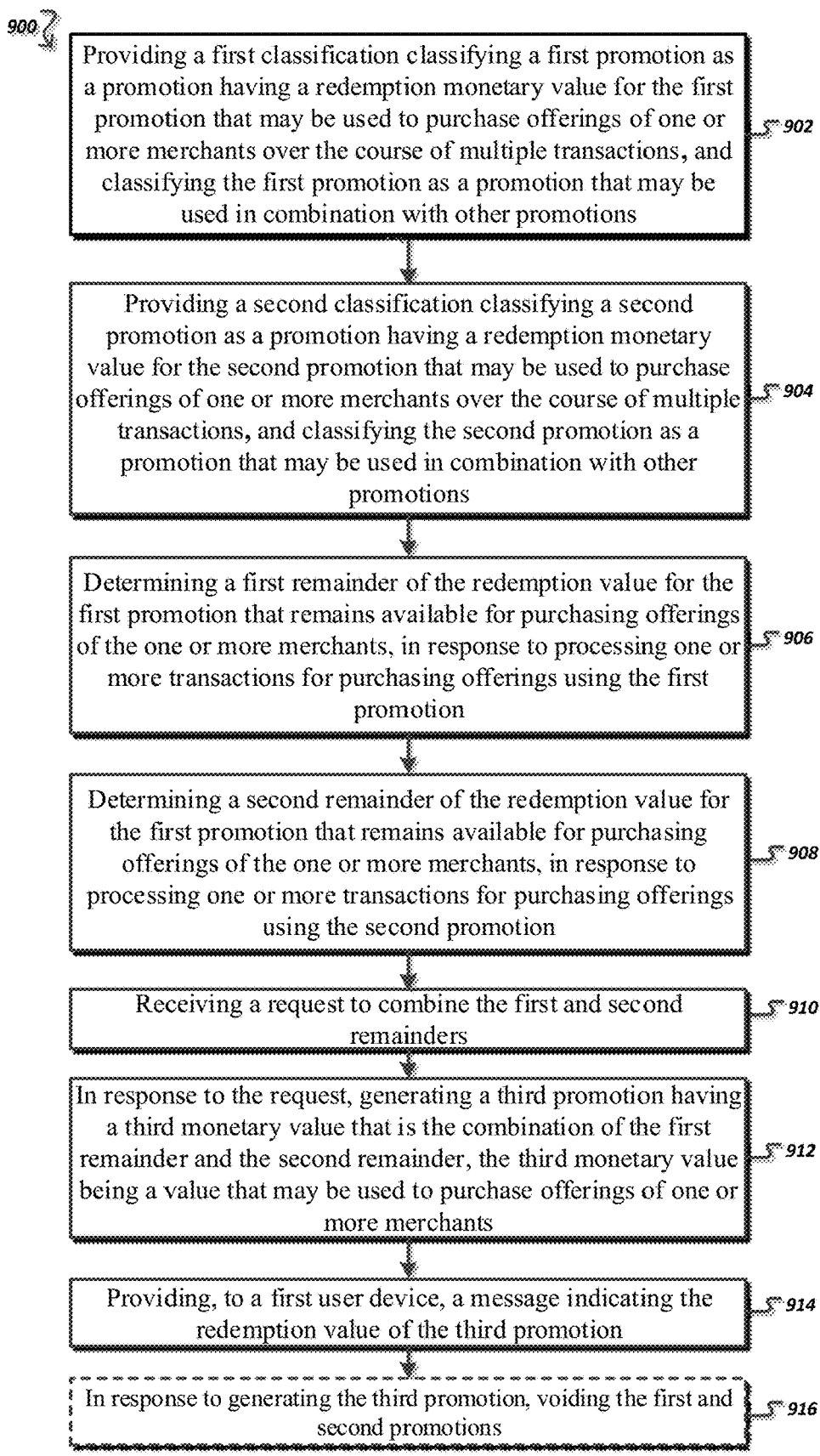

FIG. 9 is a flow chart illustrating an example process 900 for combining portions of two or more promotions. The process 900 begins with providing a first classification classifying a first promotion as a promotion having a redemption monetary value for the first promotion that may be used to purchase offerings of one or more merchants over the course of multiple transactions, and classifying the first promotion as a promotion that may be used in combination with other promotions (902). For example, the process 900 may provide a classification indicating that the first promotion may be combined with other promotions. In some implementations, the classifications may indicate that the remainder of the first promotion may be combined with other promotions. For example, the first promotion may be a promotion having a charge value of $8, and a redemption value of $20 that may be redeemed at one or more food vendors.

The process 900, similarly, provides a second classification classifying a second promotion as a promotion having a redemption monetary value for the second promotion that may be used to purchase offerings of one or more merchants over the course of multiple transactions, and classifying the second promotion as a promotion that may be used in combination with other promotions (904). For example, the process 900 may provide a classification indicating that the second promotion may be combined with other promotions. In some implementations, the classifications may indicate that the remainder of the second promotion may be combined with other promotions. For example, the second promotion may be a promotion having a charge value of $5, and a redemption value of $10 that may be redeemed at one or more food vendors.

The process 900 continues with determining a first remainder of the redemption value for the first promotion that remains available for purchasing offerings of the one or more merchants, in response to processing one or more transactions for purchasing offerings using the first promotion (906). For example, the first promotion may be used to redeem one or more food items having a total purchase price of $15. Accordingly, the process 900 may determine that the remainder of the redemption value for the first promotion is $5. Similarly, the process 900 determines a second remainder of the redemption value for the first promotion that remains available for purchasing offerings of the one or more merchants, in response to processing one or more transactions for purchasing offerings using the second promotion (908). For example, the second promotion may be used to redeem one or more food items having a total purchase price of $8. Accordingly, the process 900 may determine that the remainder of the redemption value for the second promotion is $2. In turn, the process 900 receives a request to combine the first and second remainders (910). For example, a consumer may provide a request to combine the first and second remainders using a mobile device.

In response to the request, the process 900 generates a third promotion having a third monetary value that is the combination of the first remainder and the second remainder, the third monetary value being a value that may be used to purchase offerings of one or more merchants (912). For example, the process 900 may generate a third promotion having a redemption value of $7 for redemption at one or more food vendors. In turn, the process 900 provides, to a first user device, a message indicating the redemption value of the third promotion (914). For example, the process 900 may provide to a mobile device of an owner of the first and second promotion, a message indicating that the remainders of the first and second promotions were combined and that the redemption value of the new promotion is $7. In some implementations, the process 900 ends with optional step 916, shown in phantom or dashed lines. The process 900 in response to generating the third promotion may void the first and second promotions (916). For example, once the third promotion is generated, the remainders of the first and second promotions may no longer be available to redeem offerings.

Example Processes for Requesting Partial Refunds

Figure 10:
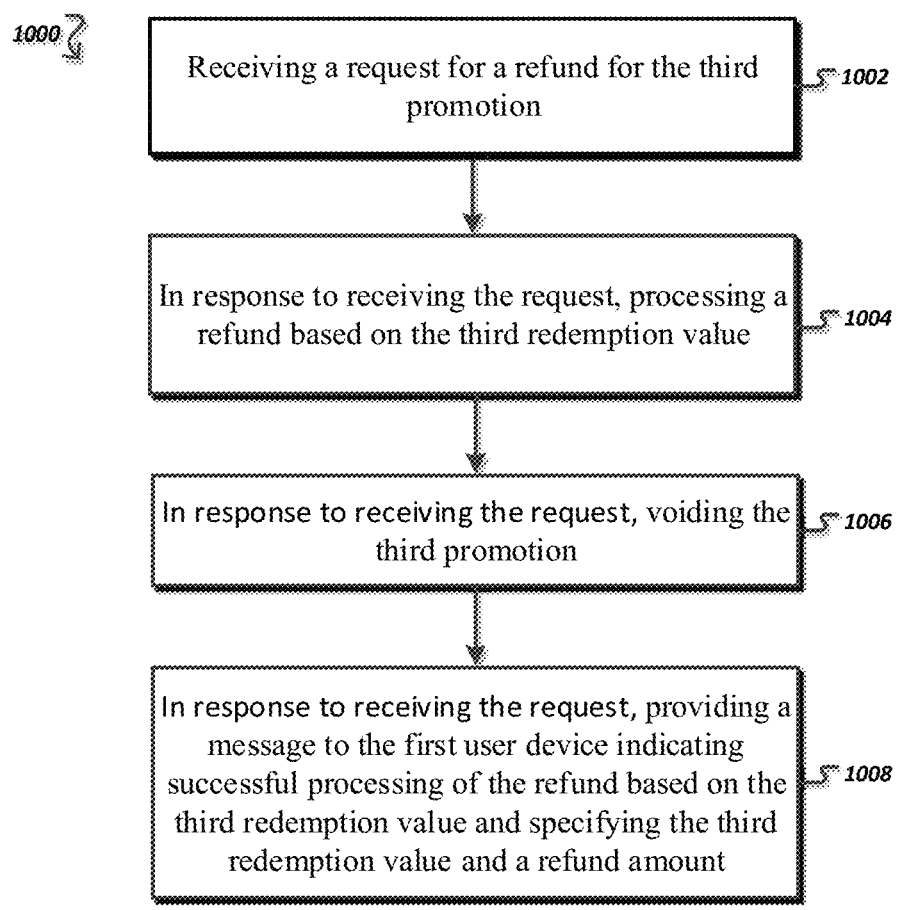

In some implementations consumers may request a refund for a remaining redemption value. For example, with reference to process 900, a user may request a refund for the third promotion. FIG. 10 is a flow chart illustrating an example process 1000 for requesting a refund. The process 1000 is described as an optional continuation of process 900. In some implementations, the process 1000 is implemented independently.

The process 1000 begins with receiving a request for a refund for the third promotion (1002). For example, the user may request a refund for combined promotion having a redemption value of $7. In response to receiving the request, the process 1000 process a refund based on the third redemption value (1004). For example, the process 1000 may refund a portion of the redemption value. In one implementation, the process 1000 may refund $1.6. In other implementations, the process 1000 may refund $7. It should be understood, that a portion of the redemption value may be refund, and that the portion may be chosen based on various attributes including the charge price for the first and second promotion.

The process 1000 continues with voiding the third promotion, in response to receiving the request (1006). For example, the process 1000 may disable the third promotion, such that the consumer cannot use the third promotion to redeem any offerings. Finally, the process 1000 ends with providing a message to the first user device indicating successful processing of the refund based on the third redemption value and specifying the third redemption value and a refund amount (1008). For example, the process 1000 may provide a message to a mobile device of the belonging to the consumer, the message indicating that a refund of $1.6 was issued successfully based on the remainder redemption value of 7$ for the third promotion. As described above, the process 1000 may be applied to or in conjunction with other processes different from process 900.

Example Process for Selectively Modifying Promotion Classifications

Figure 11:
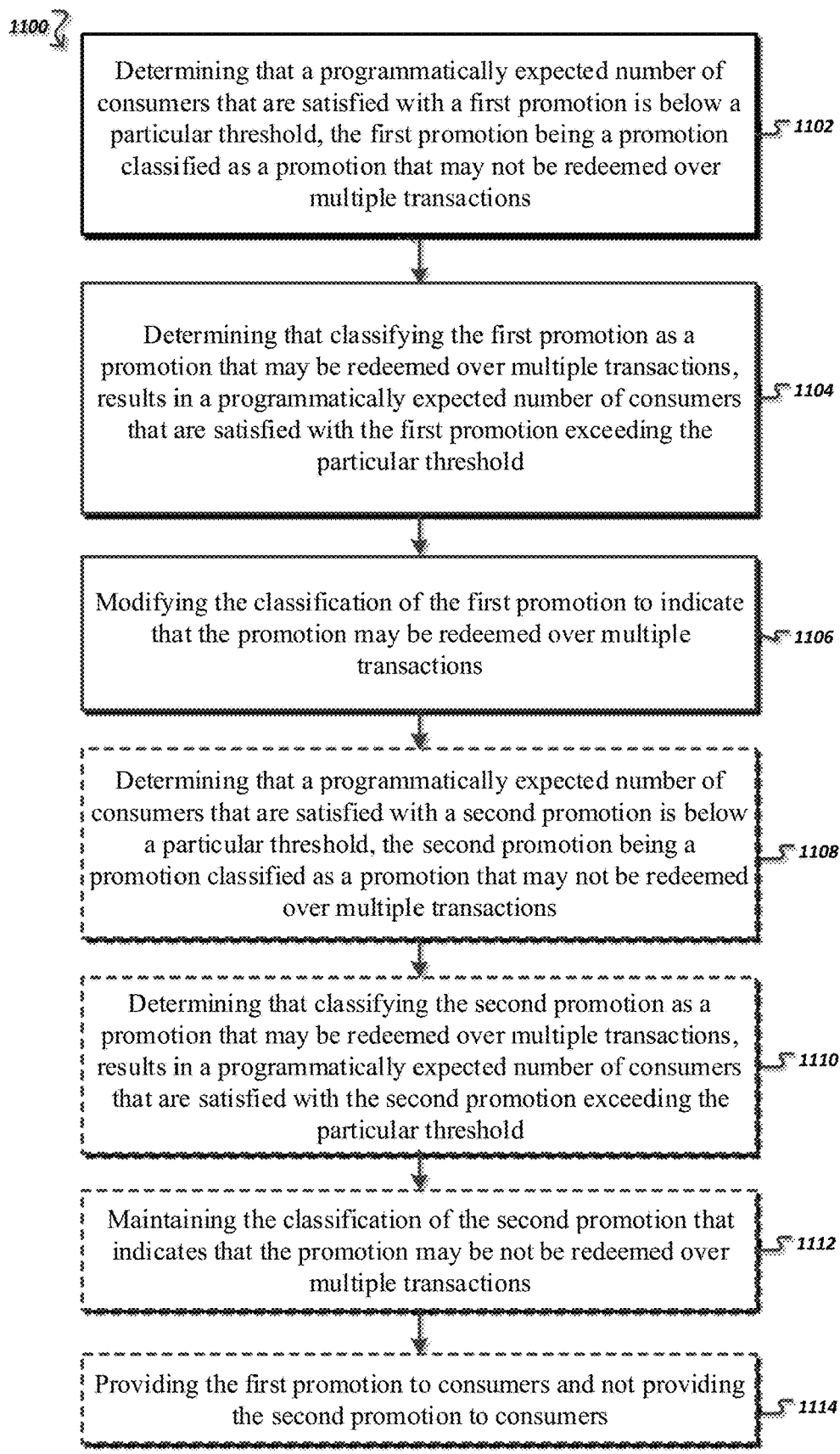

FIG. 11 is a flow chart illustrating an example process 1100 for selectively modifying classifications of promotions. The process 1100 begins with determining that a programmatically expected number of consumers that are satisfied with a first promotion is below a particular threshold, the first promotion being a promotion classified as a promotion that may not be redeemed over multiple transactions (1102). For example, the programmatically expected number of satisfied consumers may be determined based on a machine learning model. In one implementation, the programmatically expected number of satisfied consumers is determined according to a random forest model. The particular threshold may be a minimum number of satisfied users that is required in order to provide a promotion.

The process 1100 continues with determining that classifying the first promotion as a promotion that may be redeemed over multiple transactions, results in a programmatically expected number of consumers that are satisfied with the first promotion exceeding the particular threshold (1104). In some implementations, the particular threshold may be specified as 80% of consumers that will accept the promotion. For example, the process 1100 may determine that changing the classification of the first promotion, such that the promotion may be redeemed over multiple transactions, will result in more than 80% of users that accept the promotion being satisfied with the promotion. In some embodiments, the determination is based on a machine learning model. Exemplary data used in the machine learning model includes promotion performance in a similar category in the same or different market, a deal channel; whether a promotion is local (e.g., food and beverage), travel related, goods, a ticket to an event, or other time specific promotions. In some embodiments, promotion performance is based upon various factors, including project sales, population density, general interest in promotion's category, historical sales vs. refund rate, and seasonality.

The process 1100 continues with modifying the classification of the first promotion to indicate that the promotion may be redeemed over multiple transactions. For example, the process 1100 may change the classification of the first promotion to allow redemption of the promotion over multiple transactions. The process 1100 may continue with optional steps 1108-1114, shown in phantom or dashed lines.

In some implementations, the process 1100 continues with determining that a programmatically expected number of consumers that are satisfied with a second promotion is below a particular threshold, the first promotion being a promotion classified as a promotion that may not be redeemed over multiple transactions (1108). In turn, the process 1100 may also determine that classifying the second promotion as a promotion that may be redeemed over multiple transactions, results in a programmatically expected number of consumers that are satisfied with the second promotion exceeding the particular threshold (1110). For example, the process 1100 may determine that changing the classification of the second promotion will not affect or change the user satisfaction. The process 1100, then, maintains the classification of the second promotion that indicates that the promotion may be not be redeemed over multiple transactions (1112).

Finally, the process 1100 may end with, optionally, providing the first promotion to consumers and not providing the second promotion to consumers (1114). For example, the process 1100 may only provide promotions that exceed the particular threshold as described above. Accordingly, the first promotion may be provided to consumers, while the second promotion may be blocked.

A similar process to process 400 may also be applied to the consumer. For example, the promotional service may determine that a particular consumer will not accept or be satisfied with a promotion, classified as a promotion that may not be redeemed over multiple transactions, based on business analytic data associated with the consumer. In some implementations, the promotional service may re-classify the promotion as promotion that may be redeemed over the course of multiple transactions, prior to providing the promotion to the particular consumer. In some implementations, the promotion is provided to consumers different from the particular consumer without re-classification. For example, based on business analytic data, some users may receive the promotion classified as a promotion that may not be used over multiple transactions, while other users may receive the same promotion classified as a promotion that may be used over multiple transactions. In some embodiments, business analytic data comprises promotion performance data as explained above.

FIG. 12 illustrates an exemplary random forest model for use with the present system, according to one embodiment. The model includes features such as distance/location, the popularity of a service or product, whether the promotion relates to seasonal equipment or is restaurant related, whether the equipment is in season, whether the type of promotion has a particular price point, and whether the product is available online.

The exemplary random forest 1200 is composed of N trees, where N is a number. The prediction of the random forest is the average of the predictions from the N trees. The prediction from a tree is determined by a root node decision (e.g., distance to provider or product) and then traversing a logic path through the tree to a terminal leaf node based on the decision outcome determined at each successive node along the path. For example, in a model comprised of N trees where N is 5, the random forest prediction is the average of all of the trees. Based on a certain threshold, for example 0.8, the prediction returns that for the particular classification of a promotion (e.g., whether the promotion can be redeemed over multiple transactions or not), at least 80% of users will accept the promotion being satisfied with the promotion. By way of further example, if a promotion is more than 1 mile from a potential customer and the category of promotion is seasonal equipment, the promotion may receive a score of "0." As another example, if the promotion is more than 5 miles from the potential customer, and is related to a restaurant (i.e., requires the customer to travel to the restaurant), the merchant may receive a score of "0." The exemplary random forest 1200 prediction is the average of the respective predictions from trees 1, 2, 3, 4, and 5. In one example, tree 1 results in a score of "1," tree 2 results in a score of "0," tree 3 results in a score of "0," tree 4 results in a score of "0," and tree 5 results in a score of "1." The average of the scores is (1+1)/5 or 0.4. Assuming an exemplary threshold for customer satisfaction is 0.8, (e.g., if the score is greater than or equal to 0.8, the promotion will result in more than 80% of customers being satisfied with the promotion), the promotion classification in this example may be adjusted to try to reach the desired threshold.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, that is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation

The invention claimed is:

1. An apparatus comprising at least one processor and at least one non-transitory computer readable storage medium storing instructions that, with the at least one processor, cause the apparatus to:
   in response to determining, based at least in part on a predictive model, that reclassifying a promotion from a first classification to a second classification is likely to result in a programmatically generated predicted number of likely transactions to occur in association with the promotion exceeding a predefined threshold, reclassify the promotion to the second classification; and
   transmit, to a first user device, the promotion.

2. The apparatus of claim 1, wherein the first classification classifies the promotion as a promotion that may not be redeemed over multiple transactions.

3. The apparatus of claim 1, wherein the second classification classifies the promotion as a promotion that may be redeemed over multiple transactions.

4. The apparatus of claim 1, wherein the predictive model comprises a machine learning model.

5. The apparatus of claim 1, wherein the predictive model comprises performance data.

6. The apparatus of claim 5, wherein the performance data is based at least in part on a promotion category associated with the promotion.

7. The apparatus of claim 1, wherein the at least one non-transitory computer readable storage medium storing instructions that, with the at least one processor, further cause the apparatus to:
   receive, from the first user device, a request to use the promotion to pay, a first portion of a purchase price value of one or more offerings of one or more merchants; and
   process the request.

8. A computer program product comprising at least one non-transitory computer-readable storage medium having computer-executable program code instructions stored therein, the computer-executable program code instructions comprising program code instructions to:

in response to determining, based at least in part on a predictive model, that reclassifying a promotion from a first classification to a second classification is likely to result in a programmatically generated predicted number of likely transactions to occur in association with the promotion exceeding a predefined threshold, reclassify the promotion to the second classification; and transmit, to a first user device, the promotion.

9. The computer program product of claim 8, wherein the first classification classifies the promotion as a promotion that may not be redeemed over multiple transactions.

10. The computer program product of claim 8, wherein the second classification classifies the promotion as a promotion that may be redeemed over multiple transactions.

11. The computer program product of claim 8, wherein the predictive model comprises a machine learning model.

12. The computer program product of claim 8, wherein the predictive model comprises performance data.

13. The computer program product of claim 12, wherein the performance data is based at least in part on a promotion category associated with the promotion.

14. The computer program product of claim 8, wherein the computer-executable program code instructions further comprise program code instructions to:

receive, from the first user device, a request to use the promotion to pay, a first portion of a purchase price value of one or more offerings of one or more merchants; and process the request.

15. A computer implemented method comprising:

in response to determining, based at least in part on a predictive model, that reclassifying a promotion from a first classification to a second classification is likely to result in a programmatically generated predicted number of likely transactions to occur in association with the promotion exceeding a predefined threshold, reclassifying the promotion to the second classification; and transmitting, to a first user device, the promotion.

16. The computer implemented method of claim 15, wherein the first classification classifies the promotion as a promotion that may not be redeemed over multiple transactions.

17. The computer implemented method of claim 15, wherein the second classification classifies the promotion as a promotion that may be redeemed over multiple transactions.

18. The computer implemented method of claim 15, wherein the predictive model comprises a machine learning model.

19. The computer implemented method of claim 15, wherein the predictive model comprises performance data.

20. The computer implemented method of claim 19, wherein the performance data is based at least in part on a promotion category associated with the promotion.

\* \* \* \* \*